US006782436B1

(12) United States Patent
Baker

(10) Patent No.: US 6,782,436 B1
(45) Date of Patent: Aug. 24, 2004

(54) METHOD AND APPARATUS FOR LOCATING DEVICES WITHIN A NETWORK SYSTEM

(76) Inventor: Richard A. Baker, 288 Middle St., West Newbury, MA (US) 01985

( * ) Notice: Subject to any disclaimer, the term of this patent is extended or adjusted under 35 U.S.C. 154(b) by 301 days.

(21) Appl. No.: 09/640,295

(22) Filed: Aug. 16, 2000

Related U.S. Application Data

(63) Continuation-in-part of application No. 09/553,941, filed on Apr. 21, 2000.

(51) Int. Cl.[7] .............................................. G06F 3/05
(52) U.S. Cl. .............................. 710/43; 710/9; 710/15; 709/229; 709/245; 709/238
(58) Field of Search ................................ 710/9, 15, 36, 710/37, 38, 43, 64, 40, 62; 709/201, 202, 206, 223, 232, 240, 245, 229, 238, 239; 370/316

(56) References Cited

U.S. PATENT DOCUMENTS

| | | | |
|---|---|---|---|
| 5,446,897 A | * 8/1995 | Mathias et al. ............. | 395/700 |
| 5,611,050 A | 3/1997 | Theimer et al. ........ | 395/200.09 |
| 5,754,767 A | * 5/1998 | Ruiz .......................... | 709/200 |
| 5,845,094 A | * 12/1998 | Beauchamp et al. ........ | 710/100 |
| 5,982,324 A | 11/1999 | Watters .................. | 342/357.06 |
| 6,098,116 A | 8/2000 | Nixon ........................... | 710/8 |
| 6,101,188 A | 8/2000 | Sekine ......................... | 370/401 |
| 6,131,119 A | 10/2000 | Fukui ........................... | 709/224 |
| 6,147,980 A | * 11/2000 | Yee et al. .................... | 370/316 |
| 6,167,464 A | 12/2000 | Kretschmann | |
| 6,195,706 B1 | 2/2001 | Scott .......................... | 709/245 |
| 6,249,245 B1 | 6/2001 | Watters et al. .......... | 342/357.03 |
| 6,272,129 B1 | 8/2001 | Dynarski .................... | 370/356 |
| 6,295,276 B1 | 9/2001 | Datta ......................... | 370/401 |
| 6,343,317 B1 | 1/2002 | Glorikian ................... | 709/218 |
| 6,425,007 B1 | * 7/2002 | Messinger .................. | 709/224 |
| 6,448,928 B1 | * 9/2002 | Knox et al. ............ | 342/357.09 |
| 6,463,459 B1 | * 10/2002 | Orr et al. .................... | 709/203 |

OTHER PUBLICATIONS

SiRFstar Architecture, "Product Information" [online] [retrieved on Apr. 21, 2000]. Document retrieved from the Internet at the hypertext link <URL: http://www.sirf.com/arch.htm.
Product Overview, "Product Information" [online] [retrieved on Apr. 21, 2000]. Document retrieved from the internet at the hypertext link <URL: http://www.sirf.com/overview.htm.
Hiroaki Koshima, Locus Corp. & Joseph Hoshen, Contributing Editor, "Personal locator services emerge" [online] retrieved on Feb. 26, 2002. Document retrieved from the internet at the hypertext link <URL: http://www. spectrum.ieee.org/spectrum/feb2000/features/loca.html.

* cited by examiner

*Primary Examiner*—Jeffrey Gaffin
*Assistant Examiner*—Rijue Mai

(57) ABSTRACT

A method and apparatus for a communication system for facilitating communication on the network. Identification of a network device, preferably a controller or IO device, is based on a physical location of device. Accordingly, the physical location of the network device is determined by a device locator. The physical location of each network device is used to associate a network identifier, i.e., network address, with the network device to facilitate network communication with other devices. The network identifier is associated with the network device in response to a signal transmitted from the network device requesting the network identifier. A mapping method is used to convert a map of physical locations to one or more address tables so as to allow a controlling station to associate the network identifier with the network device for routing messages to and from the device based on the physical location.

32 Claims, 4 Drawing Sheets

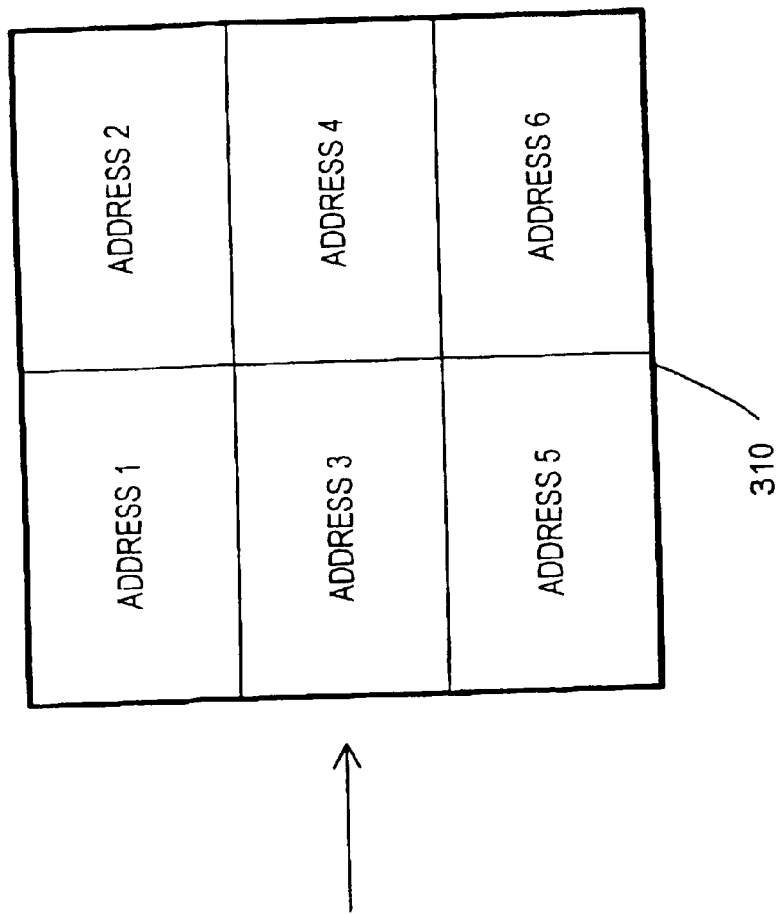
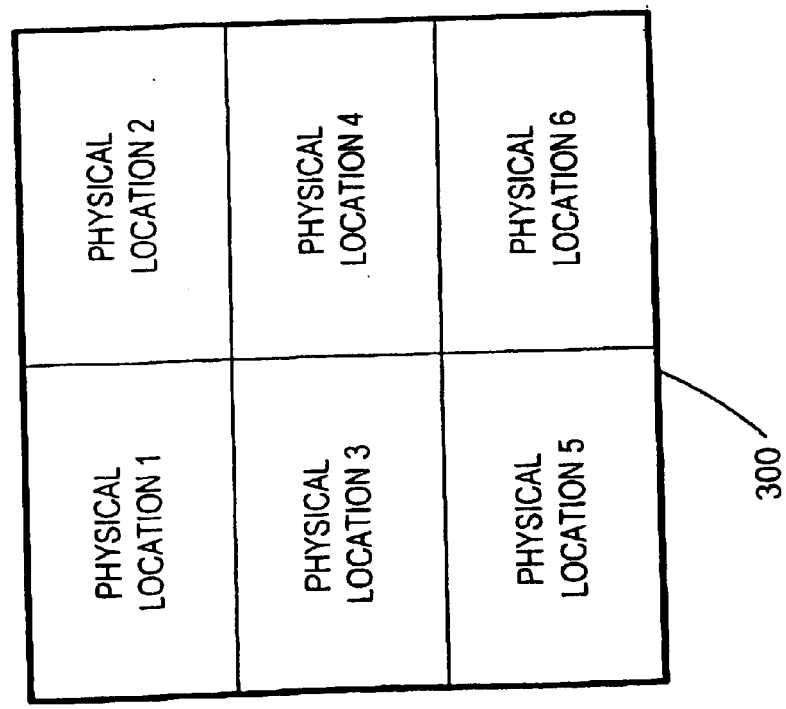
FIG. 4

METHOD AND APPARATUS FOR LOCATING DEVICES WITHIN A NETWORK SYSTEM

RELATED APPLICATION

This application is a continuation-in-part of a U.S. patent application, "Network Addressing Based On Physical Site Location Of A Network Device," Ser. No. 09/553,941 filed Apr. 21, 2000.

FIELD OF INVENTION

The present invention relates generally to a method for communication among a plurality of devices, such as input/output (IO) devices, in a network, such as a control/monitoring automation network. In particular, the present invention relates to establishing a network identity for each device.

BACKGROUND OF THE INVENTION

A local area network such as the Ethernet, can be used with a control system for industrial applications. Such a control system can be used to enable controllers, host computers, control devices such as variable frequency drives, and other devices to communicate throughout the control system. The devices connected together in such a communication link are generally referred to as "nodes." Each node has a unique network identifier, i.e., Media Access Control (MAC) address, that facilitates network communication between the nodes.

In an automation factory where a plurality of automation devices or input/output devices are used to perform a variety of intended functions, each device has a controller, such as a programmable logic controller (PLC), to communicate with a controlling workstation or the PLC of another automation device. Furthermore, the PLC includes a software program to control the network device in performing the intended function. It is quite common to place network devices at physical site locations in accordance with their particular functions. Conventionally, each of the network devices is identified by the MAC address (or an Internet Protocol (IP) address) associated with the device. The network identifier is a fixed address which is given to a device when it is manufactured or assigned by a user during interconnection with a network. The identifier, or MAC address, is unrelated to the physical site location of the device in the network.

If a PLC or other network device at a specific network location is replaced by another PLC, the replacing PLC will not be operably connected to the network until its MAC address replaces the removed PLC's MAC address in the control system's application. This network address constraint is disadvantageous in factory automation settings. For instance, if a problem arises with a network device, maintenance must be performed by professional personnel skilled in networking management to administer implementing the new MAC address. This level of involvement in network support is costly and time consuming. It is therefore advantageous and desirable to provide a method and a control system wherein the need for maintenance of the network by professionally skilled personnel is reduced or eliminated.

The present invention is provided to solve these and other problems.

SUMMARY OF THE INVENTION

A first embodiment of the present invention is directed to a method of identification of a network device based on the physical location of the network device. The method comprises the steps of identifying the physical site location of a network device and associating the physical location to the device address so as to allow the device to communicate with other devices in the network.

Another aspect of the present invention is a control system having a plurality of devices, wherein one or more devices include means for identifying the physical location so that the physical location is used as an identifier of the device in order to allow the device to communicate with other devices in the system. Preferably, a software program is used to convert a map of physical locations of the devices into an address table required for routing messages to the devices.

A further aspect of the present invention is a device to be used in a control system wherein the device includes means for identifying its own physical location so that the physical location can be used as a network identifier, i.e., address, of the device in order to allow the device to communicate with other devices in the control system.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

BRIEF DESCRIPTION OF THE DRAWINGS

FIG. 4 is a block diagram showing a mapping method for relating a physical location to the address of a network device.

DETAILED DESCRIPTION OF THE INVENTION

Figure 1:
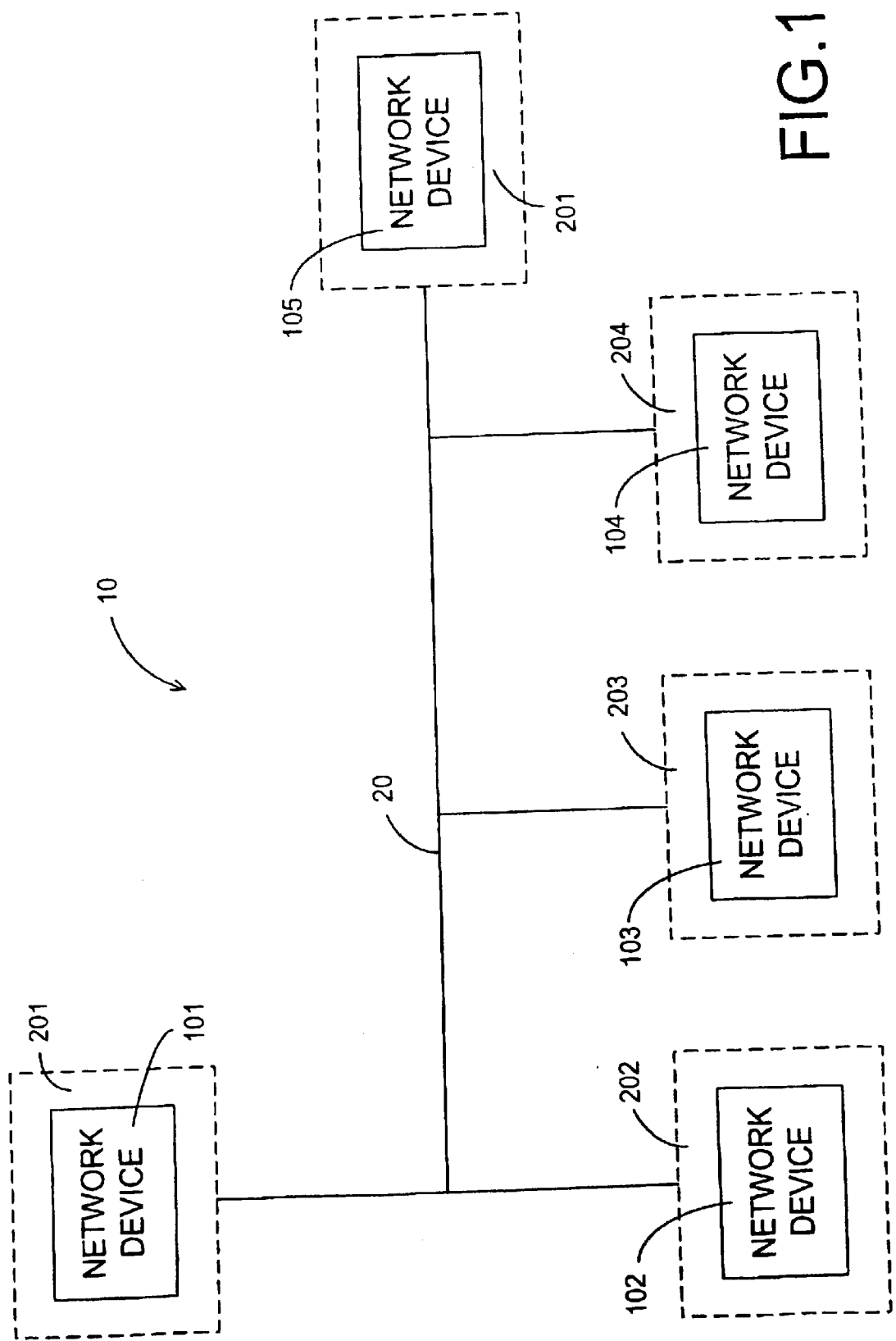
FIG. 1 is a block diagram showing a control system.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The control system of the present invention is shown in FIG. 1. As shown, the system 10 includes a plurality of network devices 101–105. Each of the network devices 101–105 is placed at one of the different physical locations 201–205, connected by a communication link 20. The devices include automation devices, IO devices, control devices, etc. The IO devices include, but are not limited to such machines as sensors, relays, gauges, valves, message displays, switches, limit switches, proximity switches, motor starters, motor controllers and any other like device as well as traditional I/O modules for PLC systems.

Figure 2:
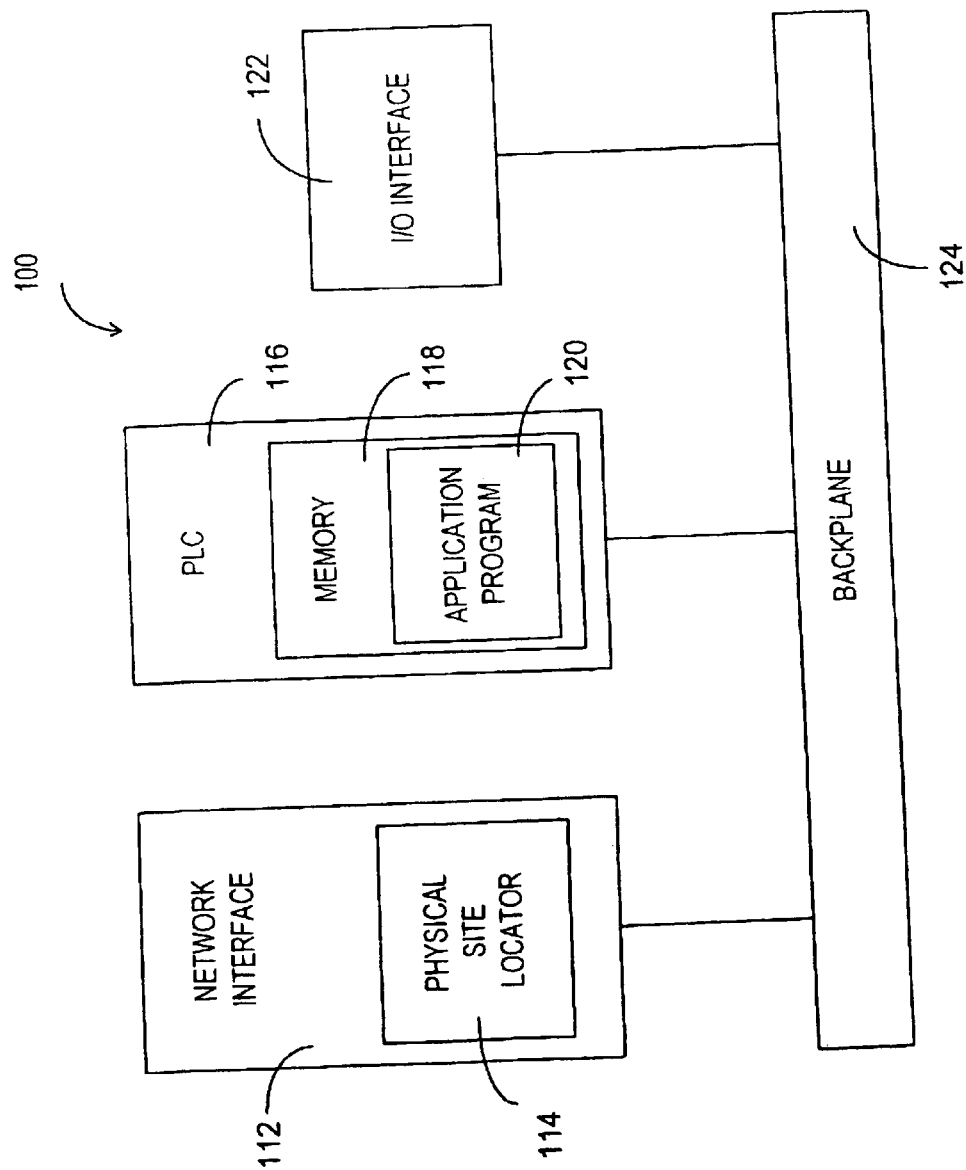
FIG. 2 is a block diagram showing a network device.

As shown in FIG. 2, each device has a controller such as a programmable logic controller (PLC) 116 for controlling the device in carrying out the intended function thereof. Preferably, the system 10 is a modified local area network (LAN) wherein the address of each device to be used for communication purposes is associated with the physical site location of the device, rather than a Media Access Control (MAC) or an Internet Protocol (IP) address that is usually associated with a PLC or to an input device of a PLC system. The control system can be any wired or wireless network, or any combination of the two, that uses electrical signals, optical signals or other forms of message signaling to convey information between devices in the system. The control system can also include one or more wide area networks (WANs). One of the network devices 101–105 may be a workstation or a master module to oversee the overall operations of the control system.

FIG. 2 shows the components in a typical network device 100, representative of the network devices 101–105 shown in FIG. 1. As shown in FIG. 2, the network device 100 includes an I/O interface 122 for exchanging signals or data with a machine or a monitoring apparatus; a network interface 112 to exchange signals or data with other network devices in a control system; a device locator 114 residing inside or outside the network interface 112 to identify the physical location of the network device 100; and a programmable logic controller PLC 116 to control the machine or monitoring apparatus to which the network device 100 is connected using an application program 120 stored in a memory unit 118. These components can communicate with each other and other network devices 100 through a bus in the backplane 124.

In a factory automation system where a variety of automation machines are organized into a control system, and each automation machine is controlled by a network device 100, each machine may have a particular function to perform. For example, one machine may perform a metal stamping function while another performs metal surface polishing in an assembly line environment. Thus, the network device 100 connected to each automation machine includes an application program 120 to control the machine. In order for the machine to carry out the intended function in a timely manner, the network device 100 must have the ability to communicate with other network devices in the system.

It should be noted that in some applications the machines connected to a network are required to perform different functions. But in other applications, all machines can be used to perform the same function. For example, in a pipeline where batches of refined petroleum products are transported within a transport pipe from one state to another, a number of instruments are used at different locations along the pipeline to monitor the flow rate, fluid pressure and the content of the passing batch. Thus, all the monitoring instruments and the application program therefor can be identical. The only difference is the location of the monitoring instruments. In this type of the application, it is advantageous to use the physical site location as the address of each monitoring instrument.

In general, when the automation factory is designed, the industrial engineer works off of a floor plan. The floor plan is refined to an individual device or machine and to the physical site location of the device. This physical location becomes the network identifier, or address, of the unit in the network control system. Once the network devices are installed according to the floor plan, a software program is used to associate the location of the devices on the floor plan to the location of the devices as identified by the device locator 114 of the network device 100 to which the network device is operably connected. Because the device locator 114 only recognizes the location of the device and not its function, the network device 100 connected to one machine can be identical to the network device 100 connected to another machine. Thus, all network devices 101–105 as shown in FIG. 1 can be identical. Once identified, all control or application programs and configuration information needed for an automation machine placed at a particular location to perform an assigned function can be downloaded from a master module, to the PLC 116 of the network device 100. Preferably, a mapping method is used to convert a map of the physical site locations of the network devices into one or more address tables required to route network messages to these devices. Such a mapping method utilizes the physical location of a network device similar to the MAC or IP address of the device with regard to the routing of messages in the network. The mapping method will be described in conjunction with FIG. 4.

Additionally, network configuration information or monitor, control and application programs can be mapped to physical site locations. Dependent upon the location of the network device, variable software application can be downloaded and input into the network device.

If a problem occurs with a network device 100 on a certain automation machine, that network device 100 can be replaced with another network device 100. Likewise, if a problem develops with a certain automation machine, it can be replaced with another similar machine, with or without changing the network device 100. Once the replacement is completed, the programs and configuration information can be downloaded again according to the physical site location as determined by the device locator of the replacement network device. Because the physical location of the automation machine remains the same, the programs or configuration information downloaded to control the automation machine will always be the same. Replacing a machine with a similar machine or replacing a network device on a machine will no longer not require the skill of a network management personnel to modify the application programs with respect to the network address. Thus, the maintenance of an automation factory is significantly simplified and can be carried out in a less costly manner.

As an additional benefit of the present invention, the location information can be used as a safety check to assure that the application intended to be executed in the network device is correct. It is not uncommon where a user places the wrong PLC program into a PLC and the wrong PLC causes an unintended operation. By double-checking the physical location, most mistakes of this type can be eliminated.

The device locator 114 is known in the art. Global positioning technology such as angle and time difference of a signal's arrival (TDOA), Personal Locator System (PLS), global positioning system (GPS) and assisted GPS are well known. The GPS incorporates a constellation of satellites and employs signal timing to determine a physical location. The assisted GPS utilizes stationary servers throughout a coverage area to assist the position locator receiver to acquire the GPS signals. Any one of these global positioning techniques, or any other global positioning technique, can be integrated in the control system to identify the location of the network device 100. However, each of these locator devices or systems has a location resolution beyond which the locator is unable to resolve. For example, a location resolution of five square feet or better may be impractical in a factory automation setting where two or more machines are located closely together.

Figure 3:
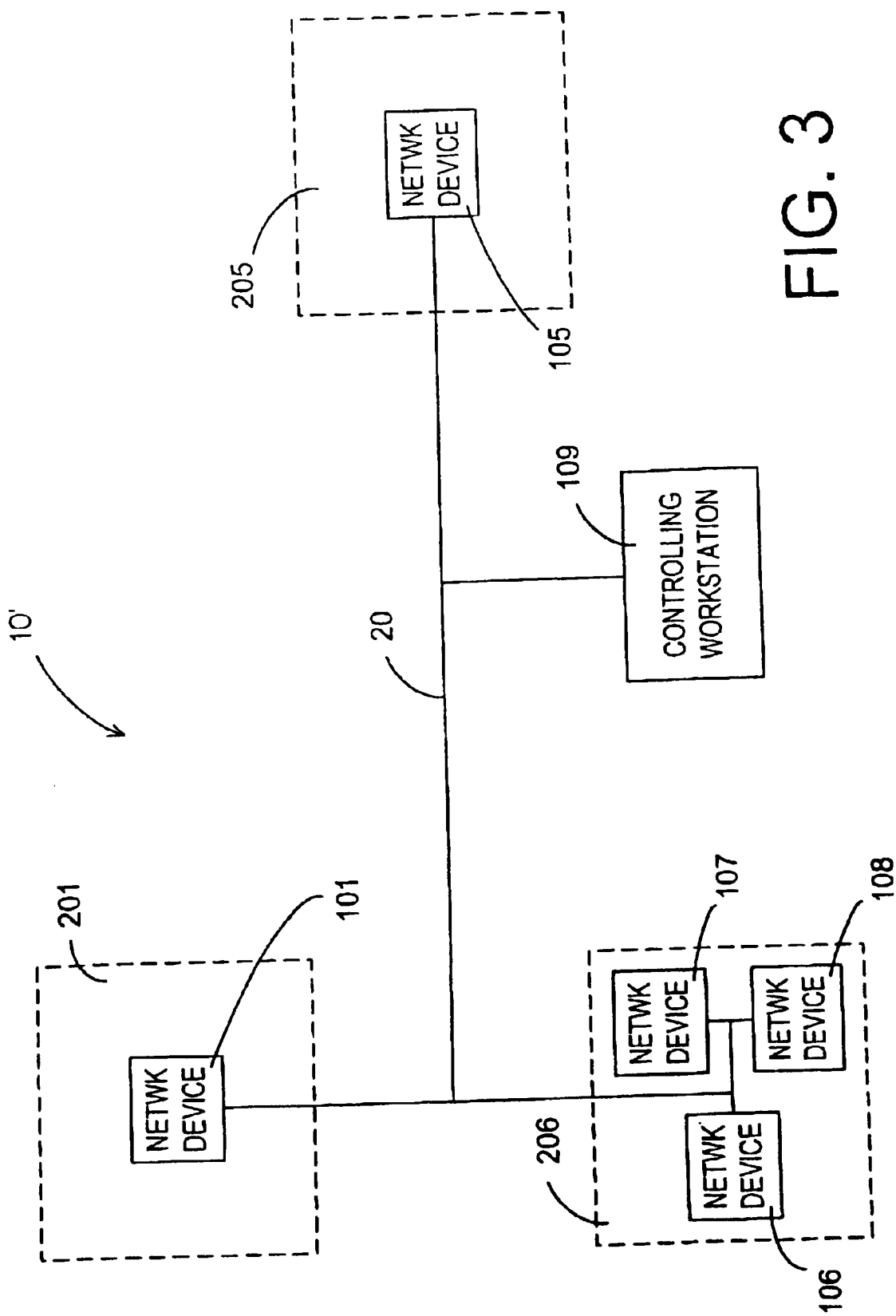
FIG. 3 is a block diagram showing a control system wherein a plurality of network devices share one physical location.

In another embodiment of the present invention as shown in FIG. 3, one physical locator can be shared with a group of machines located in a small footprint. A network 10' comprises a group of network devices 101, 105, 106, 107 and 108, and a controlling workstation 119. While the devices 101 and 105 are separately positioned in physical locations 201 and 205, respectively, the devices 106–108 are seemingly located in the same physical location 206 due to the physical locator's resolution. In such implementation, each device 106–108 can have its own device locator 114 or one device locator can be shared by the devices 106–108. However, the PLC 116 (see FIG. 2) in each of the network devices 106–108 must have its own specific network identifier, i.e., MAC or IP address.

When a PLC 116 is powered on, it learns its location from the device locator 114 and then transmits a message, providing both its MAC address and the physical location to the controlling workstation 109. The message transmitted from the PLC 116 to the controlling workstation 109 can be a Reverse Address Request Protocol (RARP) message. A software program in a controlling workstation 109 then translates the message in order to map the floor plan with the provided MAC addresses for the associated machines. As such, the controlling workstation 109 or another device can download an appropriate application program to the PLC, and the PLC will start with the application program intended for a network device in the shared location.

Whether each network device 100 is positioned in a different physical site location as shown in FIG. 1, or a number of network devices 100 share a physical site location as shown in FIG. 3, it is advantageous to link a map of the physical locations to one or more address tables for routing messages to or from the network devices. Such a mapping method is shown in FIG. 4. As shown in FIG. 4, a map 300 having six different physical locations is related to an address table 310 having six different network addresses. For example, physical location 1 is associated with network address 1, etc. Depending on the network designer, the network address can be a MAC address, an IP address or any other type of network identifier. Preferably, the mapping between the physical site location and the network address is performed by an application program in the control system.

The present invention can be applied to a variety of control and monitoring applications. For example, a utility company can use the network device associated with a meter to remotely communicate with the meter at any location without the need of identifying the meter. The network device can be programmed to automatically convey information including its physical location and the meter information to the utility company according to a stored instruction. Similarly, a pipeline company can monitor and control the flow of the material at desired locations and time intervals. A water company can monitor water usage for billing and leak detection. A mining company can use a plurality of network devices which can be easily relocated at the user's discretion to report the status of air quality, water levels, etc. Network devices can be installed along with various control and monitoring instruments at various locations in a building to communicate local temperature, humidity, air quality, lighting condition, etc. In a smaller scale, the present invention can also be applied to home automation.

It will be understood by those skilled in the art that numerous changes and deviations in the form and detail thereof may be made without departing from the spirit and scope of the present invention. For example, the control system as depicted in FIG. 1 can be replaced by a wireless network, a wired and wireless network, or a network with a plurality of gateways and bridges. Similarly, the device as depicted in FIG. 2 can be modified to include more components or to reduce the number of components. However, these variations do not depart from the scope of the present invention wherein network addressing is based, partially or completely, on the physical site location of the devices in the control system network.

Thus, the present invention has been described with respect to the preferred embodiments thereof. While specific embodiments have been illustrated and described, numerous modifications come to mind without significantly departing from the spirit of the invention and the scope of protection is only limited by the scope of the accompanying claims.

What is claimed is:

1. A communication system, comprising:
    a controller being operably connected to a network;
    a device locator being operably connected to the controller; and,
    a network identifier being associated with the controller, wherein the network identifier being determined in response to the physical location of the controller.

2. The communication system of claim 1 wherein the network identifier is a Media Access Control (MAC) address.

3. The communication system of claim 1 wherein the network identifier is an Internet Protocol (IP) address.

4. The communication system of claim 1 further comprising:
    an application program embedded within the controller, wherein the application program is selected in response to the network identifier associated with the controller.

5. The communication system of claim 4 wherein the application program embedded within the controller is selected in response to the controller.

6. The communication system of claim 1 further including an IO device operably connected to the communication system, the IO device having a network identifier wherein a second device locator determines the physical location of the IO device for associating the network identifier with the IO device.

7. The communication system of claim 6 wherein the second device locator is operably connected to the IO device.

8. The communication system of claim 1 further including a network interface operably connected to the controller, the device locator is embedded in the network interface.

9. The communication system of claim 1 wherein the device locator incorporates a global positioning system to determine the physical location of the controller.

10. The communication system of claim 1 wherein the device locator incorporates an assisted global positioning system to determine the physical location of the controller.

11. A method of identifying a controller on a communication system, the method comprising the steps of:
    identifying a location of the controller on the communication system;
    requesting a network identifier;
    determining the network identifier in response to the identified location of the controller; and,
    associating the determined network identifier to the controller.

12. The method of claim 11 further comprising selecting an application program in response to the network identifier, wherein the application program is implemented with the controller.

13. The method of claim 11 further comprising associating the network identifier to the controller wherein the network identifier is selected in response to the controller.

14. The method of claim 13 further comprising selecting an application program in response to the network identifier, wherein the application program is implemented with the controller.

15. The method of claim 11 further comprising transmitting the location of the controller to a controlling device wherein the location is associated with the network identifier of the controller.

16. The method of claim 11 wherein the network identifier of the controller is a MAC address.

17. The method of claim 11 wherein the network identifier of the controller is an IP address.

18. The method of claim 11 wherein identifying the location of the controller further comprises using a global positioning system.

19. The method of claim 11 wherein identifying the location of the controller comprises using an assisted global positioning system.

20. A communication system, comprising:
   an IO device being operably connected to a network;
   a device locator being operably connected to the IO device; and,
   a network identifier being associated with the IO device, wherein the network identifier being determined in response to the physical location of the IO device.

21. The communication system of claim 20 wherein the network identifier is a Media Access Control (MAC) address.

22. The communication system of claim 21 wherein the network identifier is an Internet Protocol (IP) address.

23. The communication system of claim 20 further comprising:
   an application program embedded within the IO device, wherein the application program is selected in response to the network identifier associated with the IO device.

24. The communication system of claim 23 wherein the application program embedded within the IO device is selected in response to the IO device.

25. The communication system of claim 20 further including a network interface operably connected to the IO device, the device locator is embedded in the network interface.

26. A communication system comprising:
   a network device being operably connected to a network;
   a device locator being operably connected to the network device;
   a network identifier associated with the network device, and,
   a signal transmitted from the network device for requesting the network identifier, the signal comprising:
      a physical location of the network device determined by the device locator, wherein the network identifier is selected in response to the signal.

27. The communication system of claim 26 wherein the signal further comprises a medium access control address of the network device.

28. The communication system of claim 26 further comprising a controlling station to receive the signal, the controlling station selects the network identifier in response to the contents of the signal and associates the network identifier with the network device.

29. The communication system of claim 26 wherein the network device is a controller.

30. The communication system of claim 26 wherein the network device is an IO device.

31. The communication system of claim 26 wherein the device locator further comprises a global positioning system to determine the physical location of the controller.

32. The communication system of claim 26 wherein the device locator further comprises an assisted global positioning system to determine the physical location of the controller.

* * * * *